Nov. 23, 1943.　　A. M. KURZAWA　　2,334,936
RESILIENT WHEEL
Filed June 18, 1942　　3 Sheets-Sheet 1
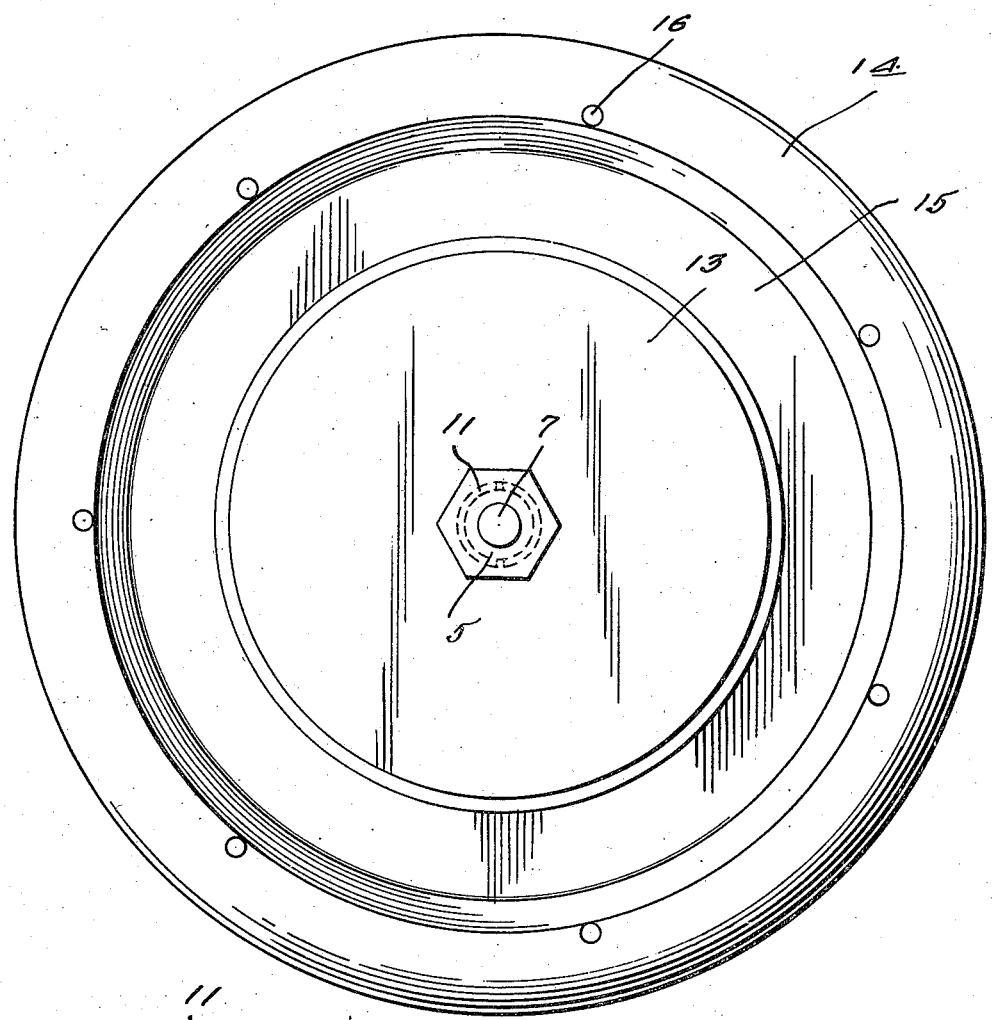
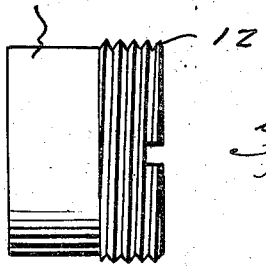
Inventor
Anthony M. Kurzawa
By Clarence A. O'Brien
and Harvey B. Jackson, Attorneys Nov. 23, 1943.  A. M. KURZAWA  2,334,936
RESILIENT WHEEL
Filed June 18, 1942  3 Sheets-Sheet 2
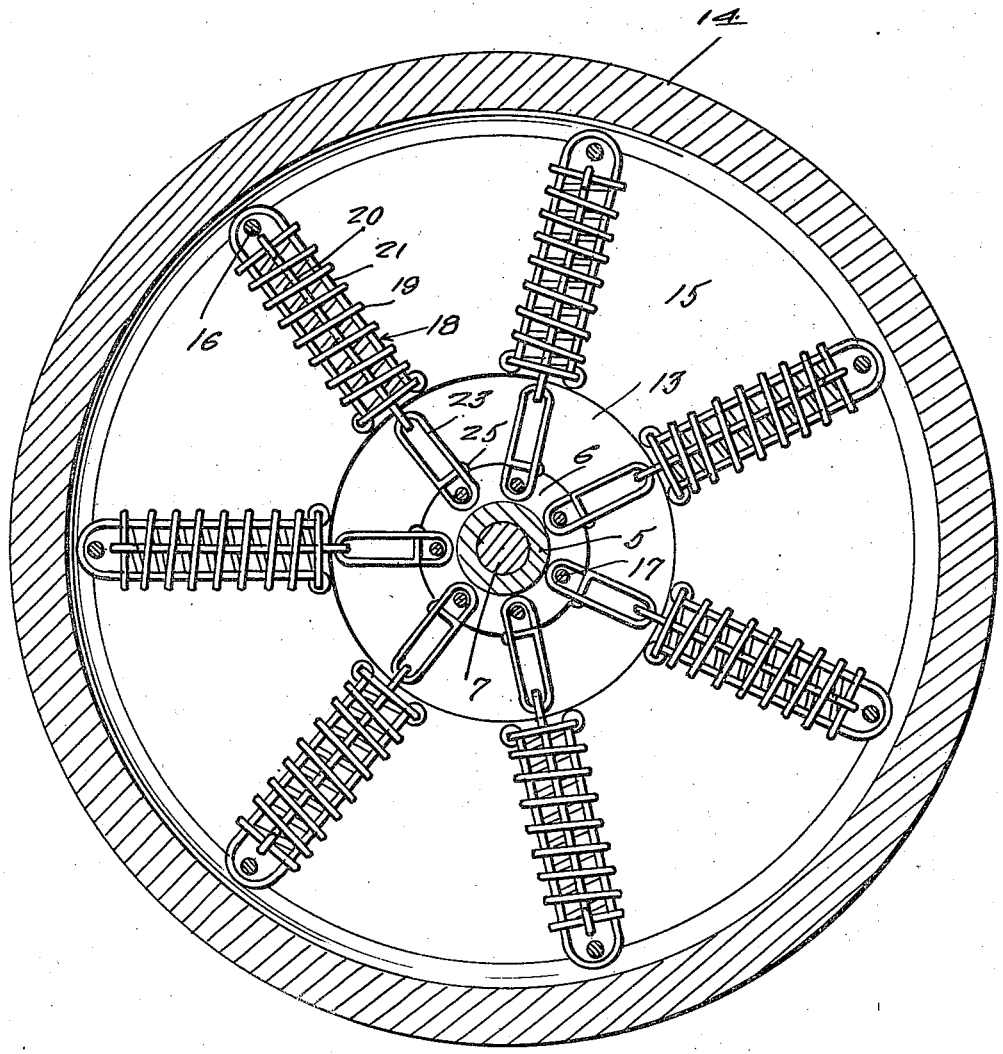
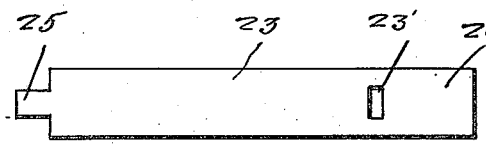
Inventor
Anthony M. Kurzawa
By Clarence A. O'Brien
and Harvey B. Jacobson
Attorneys

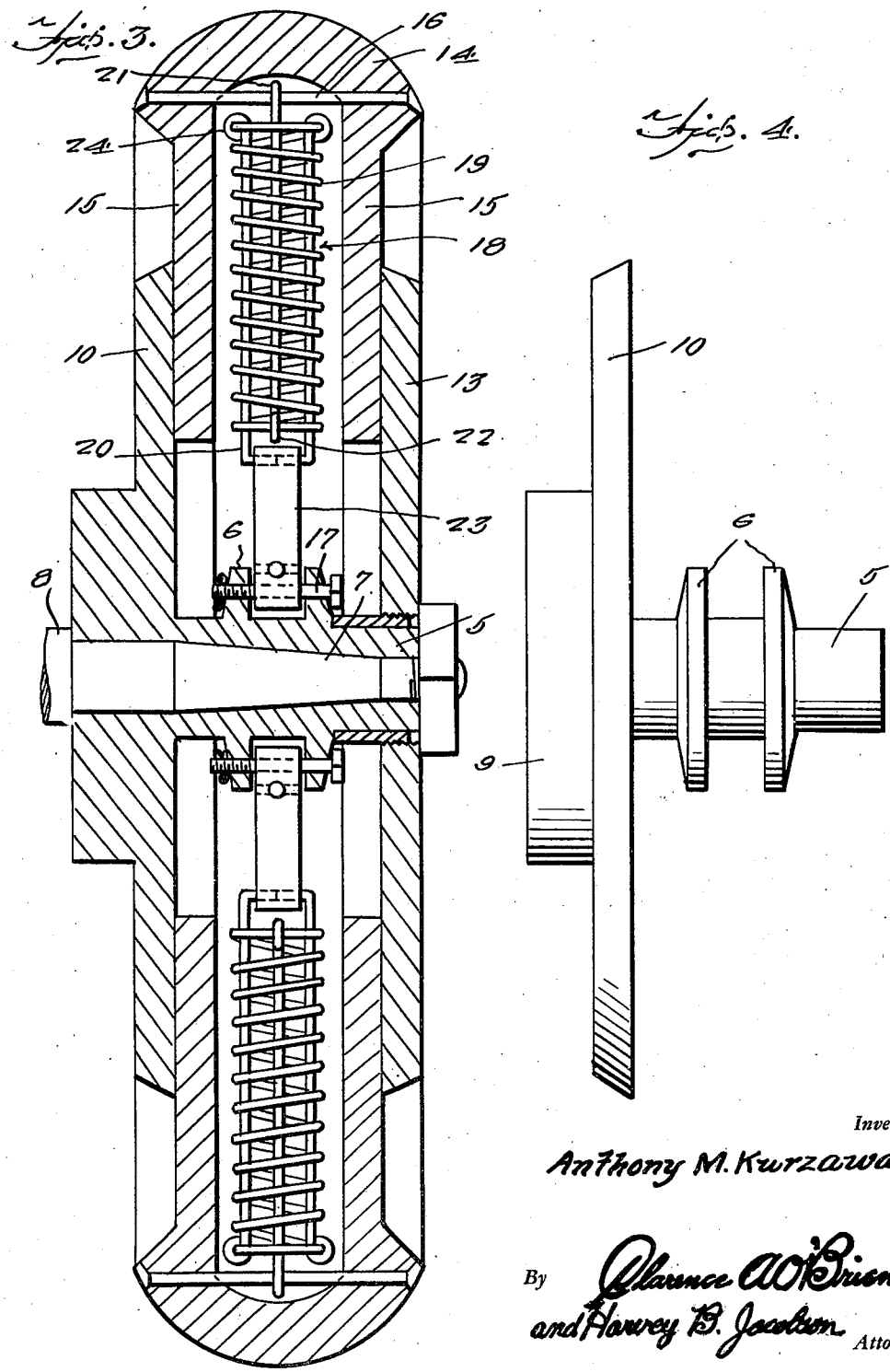

Patented Nov. 23, 1943

2,334,936

UNITED STATES PATENT OFFICE 2,334,936

RESILIENT WHEEL

Anthony M. Kurzawa, Chicago, Ill.

Application June 18, 1942, Serial No. 447,558

1 Claim. (Cl. 152—105)

This invention relates to new and useful improvements in resilient wheels and more particularly to a wheel of the spring sustaining type.

The principal object of the present invention is to provide a resilient wheel which employs no rubber or other rare materials and which can be satisfactorily used, especially on trucks and other heavy duty vehicles.

Other objects and advantages of the invention will become apparent to the reader of the following description.

In the drawings:

Figure 1 represents a side elevational view of the complete wheel.

Figure 2 is a vertical sectional view.

Figure 3 is a vertical transverse sectional view.

Figure 4 is a side elevational view of the hub and inner wall structure.

Figure 5 is a side elevational view of the retaining collar.

Figure 6 is a plan view of the blank from which the link is formed.

Referring to the drawings wherein like numerals designate like parts, it can be seen that numeral 5 denotes a hub on which are closely spaced circumferential flanges 6, 6, and at one end of this hub 5 which, of course, is hollow to accommodate the corresponding end 7 of an axle 8, is a brake drum 9 and wheel side disk 10, preferably formed integral with the hub 5.

Disposed along the outer end of the hub 5 is a collar 11 having external threads 12 onto which can be screwed a disk 13 which forms the outer wall of the wheel.

Numeral 14 denotes a transversely curved metallic tire, this being of annular shape. This tire 14 has a pair of inwardly disposed circumferential flanges 15, 15 which are slidably disposed against the inner sides of the walls 10, 13.

Pins 16 extend through the tire, while as shown in Figure 3, bolts 17 pass through the flanges 6.

There are a plurality of spring devices such as are generally referred to by numeral 18 disposed within the wheel structure and each comprises a coiled compression spring 19 and a pair of elongated U-shaped members 20, 21. For instance, the member 21 has its bight portion disposed over the corresponding pin 16 while its leg portions are disposed longitudinally through the compression spring 19 with its ends looped as at 22 around the innermost convolution of the spring 19. The bight portion of the U-shaped member 20 is engaged with the outer end of a link 23 and has its leg portions disposed outwardly through the spring 19, with its outer ends looped as at 24 over the outermost convolution of the spring 19.

The link 23 is constructed from a single strip of metal, the same having a slot 23' adjacent one end for receiving a tongue or lug 25 at the opposite end thereof, the portion 26 being bent to form a loop to embrace the corresponding bolt 17, as shown in Figure 3.

It can now be seen that the spring 19 will absorb the shock of the tire 14 riding uneven surfaces. Furthermore, the wheel can be taken apart whenever desired for the purpose of repair or replacement of parts, but it is evident that the tire will be useful for many years without noticeable wear.

The present invention can be used in any instance where rubber tires have been heretofore employed, the present invention serving to conserve rubber for automobiles, aeroplanes, trailers, tractors, various army equipment, etc.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A wheel of the class described comprising a hub, a wall on one end of the hub integral therewith, a wall removably mounted on the other end of said hub, a pair of spaced apart, annular flanges on said hub intermediate said walls, a tire transversely arcuate and including a pair of spaced apart annular flanges slidably fitting between said walls, pins extending transversely through the pair of flanges on the hub, complemental pins extending transversely through the tire outwardly of the flanges thereof, links swingably mounted at one end on the first-mentioned pins and springs connecting the other ends of the links to the second-mentioned pins.

ANTHONY M. KURZAWA.